United States Patent [19]

Young et al.

[11] Patent Number: 5,894,055
[45] Date of Patent: Apr. 13, 1999

[54] BATTERY SEPARATOR

[75] Inventors: James Young, Sunriver; Francis E. Alexander, Corvallis; Daniel E. Weerts, Albany, all of Oreg.

[73] Assignee: Amtek Research International LLC, Lebanon, Oreg.

[21] Appl. No.: 08/837,287

[22] Filed: Apr. 11, 1997

[51] Int. Cl.⁶ ............................................. H01M 2/18
[52] U.S. Cl. ................................... 429/147; 429/249
[58] Field of Search ............................. 429/247, 249, 429/130, 147

[56] References Cited

U.S. PATENT DOCUMENTS

| | | | |
|---|---|---|---|
| 631,810 | 8/1899 | Osburn | 429/147 |
| 4,072,802 | 2/1978 | Murata et al. | 429/147 |
| 4,228,225 | 10/1980 | O'Rell et al. | 429/147 |
| 4,245,013 | 1/1981 | Clegg et al. | 429/144 |
| 4,353,969 | 10/1982 | Rippel et al. | 429/144 |
| 4,788,113 | 11/1988 | Bohle et al. | 429/139 |
| 4,927,722 | 5/1990 | Bohnstedt et al. | 429/147 |
| 5,154,988 | 10/1992 | Choi et al. | 429/145 |
| 5,679,479 | 10/1997 | Young et al. | 429/147 |

*Primary Examiner*—Maria Nuzzolillo
*Assistant Examiner*—Carol Chaney
*Attorney, Agent, or Firm*—Robert E. Howard

[57] ABSTRACT

A battery separator for use in flooded cell and recombinant type lead acid batteries. The separator has a relatively thin backweb (between about 0.002 inch and about 0.008 inch). A plurality of submini-ribs extend from one or both planar faces of the backweb. The submini-ribs are substantially parallel to the longitudinal side edges of the backweb and are substantially evenly spaced across the width of the backweb. The submini-ribs are relatively short in height (between about 0.003 inch and about 0.009 inch above the adjacent planar surface of the backweb) and relatively closely spaced together (between about 0.025 inch and about 0.050 inch).

8 Claims, 1 Drawing Sheet

}

BATTERY SEPARATOR

This invention relates to a battery separator for use in flooded cell and recombinant type lead acid batteries.

In flooded cell and recombinant type lead acid batteries the positive and negative electrodes or "plates" are separated by a battery separator.

The most common type of separator currently used for flooded cell type lead acid batteries is the microporous polyethylene type. This type of separator has a composition consisting essentially of an ultra high molecular weight polyethylene, a filler (typically amorphous silica), a plasticizer (typically a processing oil), and certain minor ingredients, such as an antioxidant, lubricant and carbon black. The process of forming microporous polyethylene separator material comprises passing the raw materials through an extruder to form a homogeneous extrudate, passing the extrudate through a die and into the nip formed by two heated calender rolls to form a continuous web, extracting a substantial amount of the processing oil from the web by use of a solvent, drying the extracted web, slitting the web into lanes of predetermined width, and winding the lanes into rolls.

Microporous polyethylene battery separators have "ribs" extending from at least one planar face of the separator backweb. Such ribs are parallel to each other and to the longitudinal edges of the separator. The ribs function to provide proper spacing between the plates and to provide a space wherein free electrolyte resides. Most often, ribs are formed integral with the backweb during manufacture by having one of the calender rolls engraved with the desired rib pattern.

The rib height above the backweb, rib spacing and rib design are specified to the separator manufacturer by the battery manufacturer; the specifications are designed to maximize certain battery characteristics desired by the battery manufacturer.

Commercial microporous polyethylene separators have traditionally had backweb thicknesses between about 0.008 inch and about 0.025 inch. The height of the ribs above the backweb in such separators ranges between about 0.01 inch and about 0.10 inch with a rib spacing of between about 0.25 inch and about 1.0 inch.

More recently some separators are being commercially produced which have thinner backwebs, i.e., between about 0.06 inch and about 0.08 inch. In this lower thickness range, it has sometimes been found useful to place "mini-ribs" between the major ribs to provide added rigidity to the separator. Such mini-ribs typically have a height above the backweb of between about 0.006 inch and about 0.009 inch with a spacing between mini-ribs of between about 0.060 inch and about 0.250 inch.

In commonly owned copending U.S. patent application Ser. No. 08/646,764, filed May 8, 1996, there is disclosed a battery separator having a longitudinal dimension, a width dimension perpendicular to said longitudinal dimension, upper and lower planar faces, and a plurality of ribs (at least three) projecting from at least one planar face of the backweb, said ribs extending in a direction substantially parallel to the longitudinal dimension of the separator, each of the ribs being formed of a plurality of individual projecting embossments forming a corrugated structure comprised of alternating ridges and furrows. The ribs may extend from one or both planar faces of the separator. Where the ribs extend from both planar faces, adjacent projecting embossments (ridges) on one planar face are separated by an indentation (furrow) which forms a projecting embossment (ridge) on the other planar face of the separator. Where ribs extend from both planar faces of the separator, the ribs projecting from one planar surface may have a height equal to or different from the height of the ribs extending from the other planar surface.

While the separator described in Ser. No. 08/646,764 performs very well where the rib height does not exceed about 0.030 inch, it has been found that with rib heights in excess of about 0.030 inch compression resistance of the ribs becomes less satisfactory. By "compression resistance" is meant resistance to a compressive force applied to the tops of the ribs.

In recombinant type lead acid batteries substantially all of the electrolyte is absorbed in the separator. The separator is typically a glass fiber mat. Such separators have low puncture resistance.

It is an object of this invention to provide a substrate imparting improved compression resistance to battery separators for flooded cell lead acid batteries made by the embossing process disclosed in copending patent application Ser. No. 08/646,764.

It is a further object of this invention to provide a battery separator material useful in making battery separators for recombinant lead acid batteries.

SUMMARY OF THE INVENTION

This invention relates to a battery separator having a relatively thin backweb and a plurality of relatively short and relatively closely spaced submini-ribs extending from one or both planar faces of the backweb. The submini-ribs are substantially parallel to the longitudinal edges of the separator backweb.

DESCRIPTION OF PREFERRED EMBODIMENTS

Figure 1:
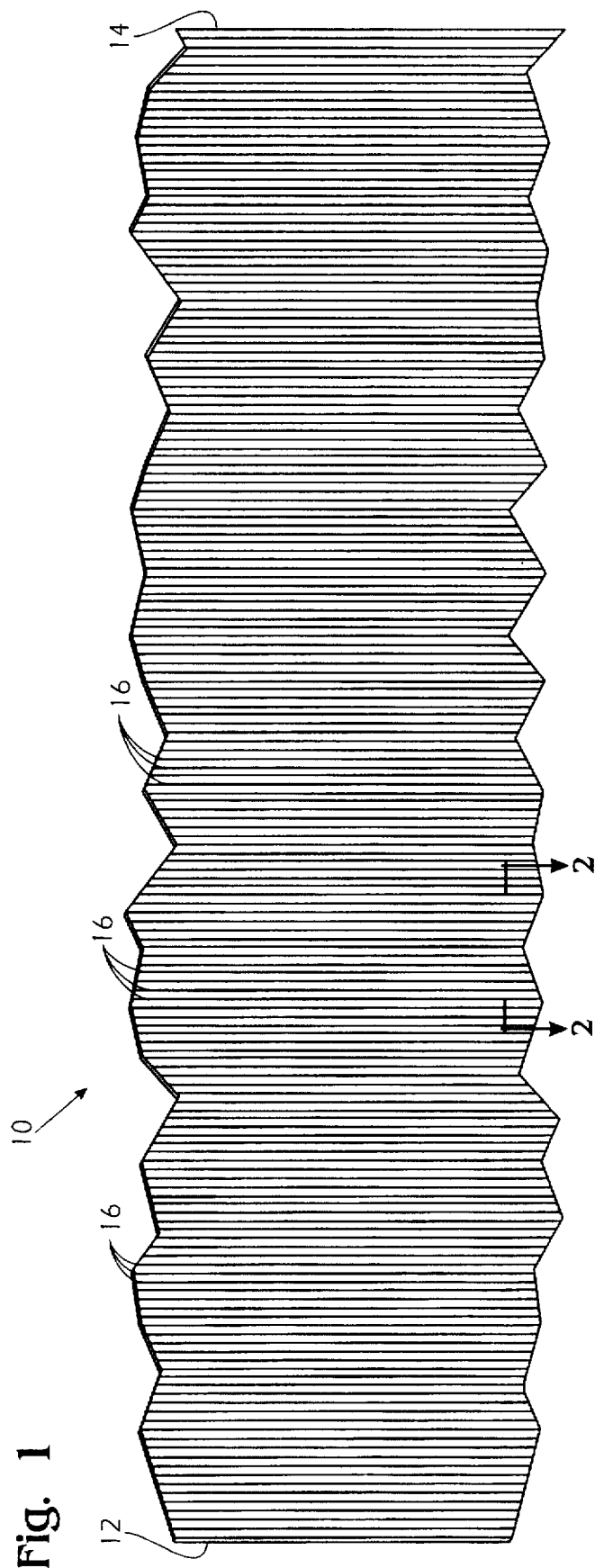
FIG. 1 is a partial top view of the upper planar surface of the separator material of this invention.

FIG. 1 is a partial top view of separator 10 having longitudinal side edges 12 and 14 and a plurality of submini-ribs 16. Submini-ribs 16 are substantially parallel to longitudinal side edges 12 and 14.

Figure 2:
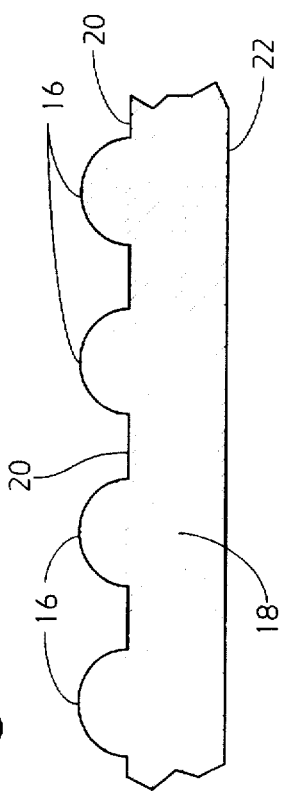
FIG. 2 is an enlarged partial cross-sectional view of the separator taken along line 2—2 of FIG. 1.

As can be seen from FIG. 2, separator 10 has a backweb 18 from which submini-mini ribs 16 extend.

Although the drawings show submini-ribs 16 extending from only the upper planar face 20 of separator 10, submini-ribs could also extend from lower planar face 22.

Submini-ribs 16 have a height above upper planar surface 20 of between about 0.003 inch and about 0.009 inch, preferably between about 0.003 inch and about 0.006 inch.

The submini-ribs 16 are substantially evenly spaced across the width of separator 10 and have a spacing of between about 0.025 inch and about 0.050 inch.

The backweb 18 of separator 10 is relatively thin, having a thickness of between about 0.002 inch and about 0.008 inch, preferably between about 0.002 inch and about 0.006 inch.

The separator 10 is useful as a substrate or base web for making the embossed rib separators disclosed in copending patent application Ser. No. 08/646,764, as is disclosed and claimed in the commonly owned copending Patent Application of James Young, et al., filed of even date herewith.

Figure 3:
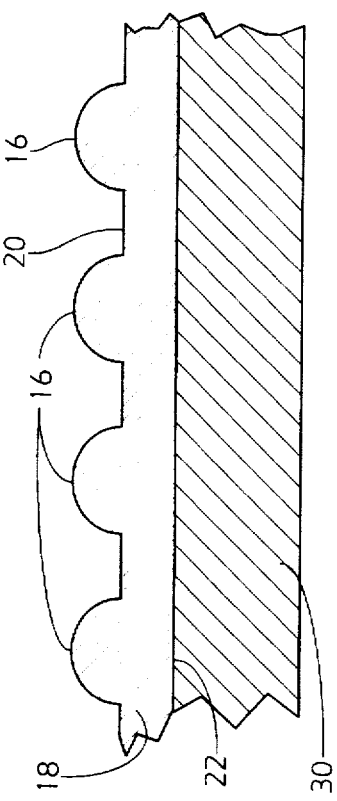
FIG. 3 is an enlarged partial cross-sectional view of a battery separator useful for recombinant type lead acid batteries.

The separator 10 is also useful as a component of the separator used in recombinant type lead acid batteries. In recombinant type lead acid batteries substantially all of the electrolyte is absorbed in a separator that is, typically, a glass fiber mat. Such glass fiber mats are well known in the art; typically they have a basis weight of between about 140 and about 170 grams/square meter and a thickness between about 0.015 inch and about 0.120 inch. However, recombinant separators made of glass fiber mats do not have good puncture resistance in a high vibration environment, such as is present in an automotive battery. Laminating the separator 10 of this invention to a glass fiber mat 30, as illustrated in FIG. 3, provides a composite separator for recombinant batteries having greatly improved puncture resistance in such high vibration operating environments and yet, because of the relatively thin backweb and low submini-rib height, does not interfere with the recombination reaction taking place in the battery. Also, the separator 10 laminated to a glass fiber mat 30 provides improved puncture resistance during battery manufacture by providing a smooth surface between the glass mat and the adjacent battery plate; the rough surface of a glass fiber mat can cause the mat to be more easily torn during movement generated in assembling a battery cell, thereby causing shorting of the cell.

Although microporous polyethylene is the preferred separator material for practicing this invention, any separator material which is porous, acid resistant and capable of being permanently embossed may be used. These materials may be generally characterized as filled or unfilled films and nonwoven webs of thermoplastic or thermoset polymers. Suitable thermoplastic polymers include polymers and copolymers of ethylene, propylene, butylene, vinyl chloride and styrene. Suitable thermoset compositions include phenolics, ethylene/propylene/diene, isoprene, butadiene, styrene and similar thermosetting polymers.

The invention claimed is:

1. A battery separator comprising a backweb of porous, acid resistant, embossable material, said backweb having longitudinal side edges, a width dimension perpendicular to said longitudinal side edges, and first and second planar surfaces, said separator having a plurality of submini-ribs projecting from at least one planar surface of said backweb across substantially the entire width of said separator, the longitudinal dimension of said submini-ribs extending substantially parallel to said longitudinal edges of said backweb, each of said submini-ribs being substantially evenly spaced apart by a distance of between about 0.025 inch and about 0.050 inch, said submini-ribs having a height above the backweb of between about 0.003 and about 0.009 inch.

2. The battery separator of claim 1 wherein said backweb is microporous polyethylene.

3. The battery separator of claim 1 wherein said submini-ribs have a height above the backweb of between about 0.003 inch and about 0.006 inch.

4. The battery separator of claim 1 wherein said backweb has a thickness of between about 0.002 inch and about 0.008 inch.

5. The battery separator of claim 1 wherein said backweb has a thickness of between about 0.002 inch and about 0.006 inch.

6. The battery separator of claim 1 wherein said submini-ribs extend from only one of said planar surfaces of said backweb.

7. The battery separator of claim 6 wherein a glass mat is laminated to the other planar surface of said separator.

8. The battery separator of claim 7 wherein said glass mat has a thickness between about 0.015 inch and about 0.120 inch.

* * * * *